United States Patent [19]

Maali et al.

[11] Patent Number: 5,694,482
[45] Date of Patent: Dec. 2, 1997

[54] SYSTEM AND METHOD FOR LOCATING SOLDER BUMPS ON SEMICONDUCTOR CHIPS OR CHIP CARRIERS

[75] Inventors: Ferevdoun Maali, New York; Leonard J. Poch, Apalachin; George E. Hickok, Marathon, all of N.Y.

[73] Assignee: Universal Instruments Corporation, Binghamton, N.Y.

[21] Appl. No.: 779,025

[22] Filed: Jan. 6, 1997

Related U.S. Application Data

[63] Continuation of Ser. No. 337,828, Nov. 8, 1994, abandoned.

[51] Int. Cl.⁶ ........................................................ G06K 9/00
[52] U.S. Cl. .................................. 382/151; 348/87; 382/145
[58] Field of Search .............................. 382/151, 125, 382/145, 294, 146; 348/94, 95, 87; 356/373

[56] References Cited

U.S. PATENT DOCUMENTS

| | | | |
|---|---|---|---|
| 4,547,800 | 10/1985 | Masaki | 382/151 |
| 4,628,464 | 12/1986 | McConnell | 382/151 |
| 4,944,021 | 7/1990 | Hoshino et al. | 382/125 |
| 4,980,971 | 1/1991 | Bartschat et al. | 29/833 |
| 5,113,565 | 5/1992 | Cipolla et al. | 382/151 |
| 5,461,417 | 10/1995 | White At Al. | 348/87 |

*Primary Examiner*—Dwayne Bost
*Assistant Examiner*—Brian L. Johnson
*Attorney, Agent, or Firm*—Banner & Witcoff, Ltd.

[57] ABSTRACT

An automated vision system for identifying patterns, such as the solder bump patterns or leads of electronic components. The system is capable of correctly identifying the deviations of an imaged pattern from the nominal location of a reference pattern even if the imaged features are displaced more than half the minimum distance between any two adjacent features of the reference pattern. Further, the system is not limited to identifying patterns that have been merely translated relative to the reference pattern, but can be used if the imaged pattern has been rotated more than 45° relative to the reference pattern depending on the symmetry of the pattern.

22 Claims, 6 Drawing Sheets

SYSTEM AND METHOD FOR LOCATING SOLDER BUMPS ON SEMICONDUCTOR CHIPS OR CHIP CARRIERS

This application is a file wrapper continuation of application Ser. No. 08/337,828, filed on Nov. 8, 1994 now abandoned.

FIELD OF THE INVENTION

The present invention is generally directed to a system and method for pattern recognition. The invention may be used in many different environments, but is particularly useful for identifying solder bump patterns or component lead patterns on electronic components, semiconductor chips or chip carriers, such as so-called "flip" chips or ball grid arrays and multi-chip modules or other electronic components. From these patterns, the position and orientation of the electrical interconnect features of the electronic components can be automatically identified and the desired location for placement of the component is automatically determined.

BACKGROUND OF THE INVENTION

One known system for placing semiconductor chips on a substrate, is shown in U.S. Pat. No. 4,980,971 to Bartschat et al., incorporated herein by reference to the background of the present invention and a general discussion of one known visual alignment system known in the art. Bartschat et al. employ a first camera to capture the image of a substrate to locate a pair of datum points thereon while a second camera captures the image of the chip to locate a second pair of datum points. A vision system processes the output signals of the cameras to establish the precise location of the datum points on the substrate and the chip to be mounted thereon. This location information is used to control robotic arms to cause a gripper to place the chip on the substrate in such a way that the datum points match.

FIG. 9A shows a typical sample reference feature (in particular, bump) pattern RP in the form of solid dots representing individual features thereof having at least one distance therebetween of $P_{MIN}$ as shown. Conventional vision systems, such as that shown by the patent to Bartschat et al., require that the pattern image PI under examination be closely in position and orientation to the corresponding reference pattern image RP stored in the system, as shown in FIG. 9B, wherein the pattern image under examination PI, one representative feature (in particular, a bump) of which is called out and is shown as open dots, and the stored reference pattern RP also has one representative bump called out. In order to be able to identify the pattern under examination, the image of each feature (bump) in the pattern must be displaced less than half the minimum distance between any feature of the reference pattern, that is, less than $P_{MIN}/2$. This restriction severely limits the practical application of conventional systems.

SUMMARY OF THE INVENTION

The present invention visually identifies and locates feature patterns, such as the solder bump pattern or leads of electronic components. The present invention is capable of correctly identifying the features in a pattern even if the features within the field of view are displaced more than half the minimum distance between any two adjacent features, that is, more than half of $P_{MIN}$ ($P_{MIN}/2$), as shown in FIG. 10.

Further, the invention is not limited to situations wherein the object is merely translated relative to a reference image of the object, but can be used if the image under examination has been rotated relative to the stored reference pattern image. If the pattern is four-fold rotationally symmetric (that is, symmetric at every 90° of rotation), the pattern may be rotated up to $\alpha=45°$ and still be uniquely identifiable. If the pattern is two-fold rotationally symmetric (that is, every 180°, then it may be rotated up to 90° and still be uniquely identifiable. If the pattern is rotationally non-symmetrical, the pattern may be rotated up to 360° and still be identifiable.

Also, the invention allows the component to be imaged in multiple fields of view (so that only a portion of the solder bump pattern is visible on a single frame). The invention is tolerant of surface anomalies, such as dust or the like, which may create an image similar in appearance to solder bumps. The present invention is particularly useful in applications involving large or complex solder bump patterns.

Moreover, the present invention can be scaled in size or speed, that is, the fundamental technique can be varied to balance the time required to perform the process with the accuracy and precision desired of the process.

More particularly, (referring briefly to FIG. 1B), the invention involves an image processing system 8 which develops a model for the reference pattern (step 101) from the blueprint coordinates of the individual features in the pattern input via blueprint input 6. These coordinates are derived from the design blueprint for the object containing the pattern from the manufacturer or other such reliable source. A convenient X-Y reference frame is chosen and superimposed on the pattern. The model for the entire pattern is the composite of representations for each of the individual features in the pattern, while the representation for each feature is a multi-dimensional vector. The elements of this vector are themselves the position vectors of the other features in the pattern described in a complex coordinates frame of reference with its origin at the location of the feature whose representation is sought.

The collection of models from all features in the pattern defines the complete set of prototype classes for "ideal" features, that is, those on the design blueprint. This complete set can be narrowed down or "pruned", for efficiency's sake, by classifying the representation of each feature against all others through the identical classification process which, as described later, is used to classify imaged features, and then removing from the prototype class list those blueprint features which classify incorrectly. The vectors then are preferably arranged in a classification list from the shortest to the longest. By scanning the prototype classes, a subset of prototype subclasses with unique representation within the permissible rotation bounds is obtained.

Two arbitrary anchor points are also defined for the pattern model. A pair of anchor vectors is obtained from the anchor points for every prototype feature. The anchor vectors define the displacements between the respective features and the anchor points.

In operation, a robotic mechanism acquires an object having a pattern to be identified thereon, such as a semiconductor chip or other component from a storage area such as a chip tray. Using the example of a semiconductor "flip" chip, one surface of the acquired component has a pattern formed thereon PI of solder bumps which serve as electrical interconnect points. The surface of the component populated with solder bumps is imaged by a video camera (step 102). After preprocessing the image (step 103), an image segmentation process (step 104) corrects the imaged solder bumps to form singular points located at the center of the images of the solder bumps. Each such point is assigned a multi-dimensional vector representation whose elements are derived from the coordinates of all other such points in a complex coordinate frame of reference with its origin on the point whose representation is sought. This is the equivalent representation as that established for the prototype model classes for "ideal" bumps. At step 106, the ideal solder bump patterns are compared to the imaged solder bump patterns, so that each point representing a solder bump in the image is identified as corresponding with a point in the blueprint model. From this comparison, the direction and degree of translation and rotation are determined, thus defining the actual pattern location relative to the ideal model (step 107). Moreover, utilizing the present invention, location can occur at resolutions of less than 5–10 microns, a five-fold improvement over known visual alignment systems.

BRIEF DESCRIPTION OF THE DRAWINGS

The above aspects of the present invention are illustrated in the drawings, wherein.

DETAILED DESCRIPTION OF THE PREFERRED EMBODIMENTS

Figure 1A:
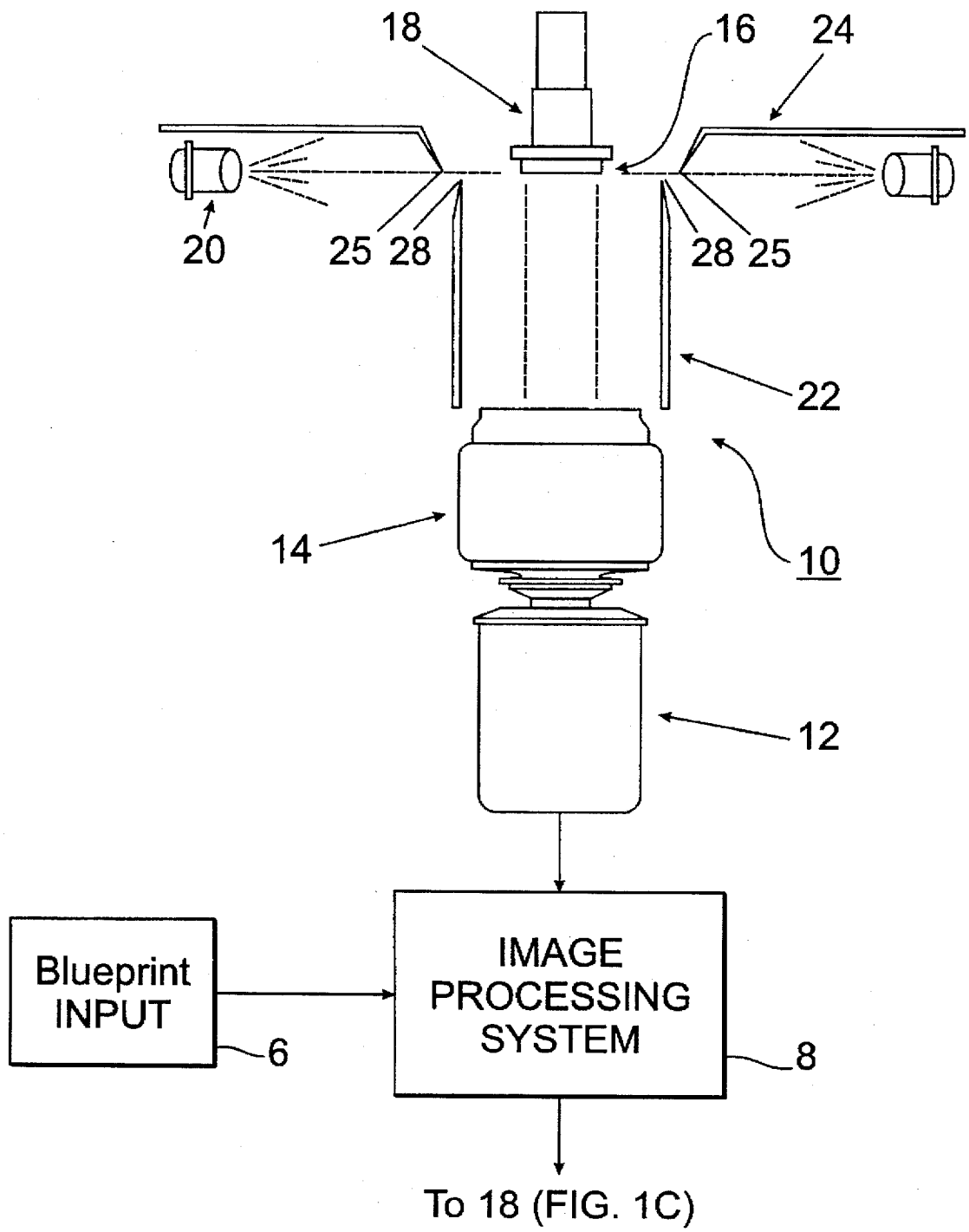
FIG. 1A is a perspective view of the imaging system used to image solder bump patterns in accordance with the present invention.

FIG. 1A shows an imaging system 10 for use in the present invention. System 10 includes video camera 12 having camera lens 14. Video camera 12 may be a standard resolution television camera for outputing an NTSC television signal (US and Japan) or PAL or SECAM signal (elsewhere). In an alternative embodiment, a high definition television signal in accordance with the so-called Grand Alliance format or other high definition format may be utilized. Moreover, an improved digital image camera apparatus may be employed available from Eastman Kodak in Rochester, N.Y. or other manufacturers. The trade-off in camera selection relates to the costs of the improved resolution versus the required field of view of the component 16 under examination. For example, a typical die for a flip chip comprises 10 mm. square. Yet, the placement accuracy required for flip chip assembly is on the order of 25 micrometers. The solder bumps themselves are on the order of 25 to 100 micrometers in diameter. Standard resolution video signals are sufficient for this purpose, saving considerable expense in the provision of such camera devices.

The subject component 16 is held by any suitable support, such as a standard component holder or robotic mechanism 18. For example, mechanism 18 may comprise a vacuum nozzle for applying a vacuum between component 16 and the structural walls of mechanism 18. Mechanism 18 comprises a component of a gantry-type robotic arm assembly or related device.

Component 16 is illuminated by at least one light source 20. In one of the preferred embodiments, a pair of light sources 20 is used, as shown in FIG. 1A. When two light sources are used, they may be arranged oppositely in, or just below, the plane of the bottom surface of component 16 so as to fully illuminate details of the component surface. Light sources 20 may alternately comprise a circular array, for example, of light emitting diodes which project a shallow cone of light radially inwardly onto the surface of component 16. System 10 may also include apertures defined by edges 25, 28 of foreground and background shields, 22 and 24, respectively, as may be necessary to shield ambient light and collimate the light on the features. It is emphasized, however, that any suitable lighting configuration may be used, as long as it allows the features to be seen with a sufficient degree of sharpness and contrast, and the examples of light sources given herein are not intended to be in any way limiting.

For example, when the features to be identified are solder bumps on semiconductor chips, we have found that producing a nearly flat sheet of light parallel to the surface of the component at a high angle of incidence relative to the component, preferably in the region of the Brewster's Angle, will provide sufficient illumination. Being in the region of the Brewster's Angle for the particular material covering the component reduces the energy reflected from surface features in the semiconductor below its top surface passivation layer. Light projected at this high angle of incidence illuminates the solder bumps on the component in such a way that they are imaged by the camera as bright rings on a dark background.

When the features to be identified are leads on a chip, we have found that diffuse lighting projected at a lower angle of incidence coaxial to the viewing direction may be used. This type of illumination may also work well for ball grid array (BGA) packages.

Thus, it is to be understood that the manner of illuminating the bump, lead or other pattern under examination may depend on the type of feature pattern being examined, and neither the type of pattern discussed (bump patterns) nor the illumination technique employed are intended to be a limitation on the present invention.

If desired, an image segmentation process may be used to reduce the solder bumps imaged by camera 12 to singular points in a complex coordinate frame, that is, to enhance the features within the field of view and suppress all features outside the field of view. Such image segmentation processes are known to those skilled in the art. For example, one known image segmentation process known as "Generalized Hough Transform" may be used. This process is adept at distinguishing between features having varying shapes and sizes, but is somewhat intolerant of imperfections in the image. Another example of a known image segmentation process which may be used is "Vector Correlation". This process is generally better than the Generalized Hough Transform when working with imperfect images of features. Of course, it is to be understood that other image segmentation processes may be used, as long as the process identifies and locates the individual features under consideration.

Figure 1B:
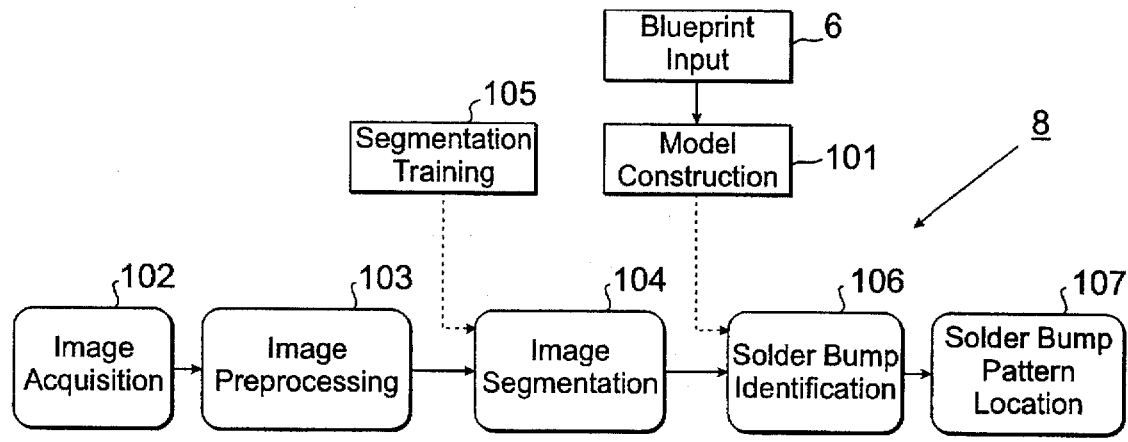
FIG. 1B comprises a functional block diagram of the solder bump pattern location process followed by the system 10 of FIG. 1A.

Computerized reference models of patterns of solder bumps on a component are created from the blueprints for the component and may be stored in computer memory of image processing system 8 (step 101, FIG. 1B). These are input through blueprint input 6. The blueprint data may be directly input from computer aided design (CAD) apparatus for designing the blueprint or input as data input through keyboard, tape, disc or other input apparatus. Ultimately, the solder bump image taken by the camera is reduced to a representation for the bumps and stored in memory. The stored representation can be compared with a representation of the bumps in the stored reference models of system 8 in order to identify the solder bump patterns on the component. Preferably, the representations comprise vector representations, as will be further described herein.

Image processing system 8 may be any suitable image processing system known in the art, programmed according to the algorithm as described herein. For example, image processing system 8 may comprise a Model AIS 3500EX system available from Applied Intelligence Systems of Ann Arbor, Mich. Nevertheless, the image processing system 8 preferably comprises a system following a single instruction multiple data (SIMD) architecture. For example, the AIS 3500EX comprises an array of 128 processors under control of a Motorola 68020 control processor operating on multiple sets of data of memory. Image processing system 8 preferably comprises multiple input ports for receiving multiple camera imaging signals if multiple camera inputs are required.

Figure 1C:
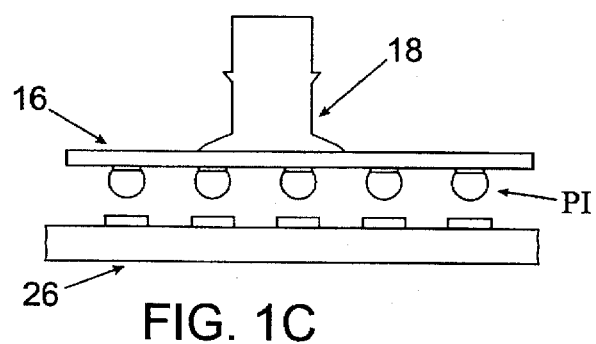
FIG. 1C is an enlarged view of mechanism 18 of FIG. 1A locating a component having a solder bump pattern over a substrate having a corresponding attachment site pattern.

FIG. 1B comprises a functional flow diagram of the solder bump pattern recognition process according to the present invention as accomplished by image processing system 8. Step 101 relates to the input of blueprint data through input 6 as described above. Step 102 relates to the acquisition of an image from camera 12 generally referred to as pattern image PI under examination. The robot mechanism 18 then carries the component 16, for example, a semiconductor flip chip, to a substrate for placement as shown in FIG. 1C. Concurrently, the image PI of the solder bump pattern is processed to extract its location with respect to the robot's reference frame as will be subsequently described herein and in accordance with step 103. Preprocessing step 103 involves reducing the incident image to directional edgels. The image segmentation scheme step 104 relies on the derivation of a set of correlation vectors or shifts from a suitable exemplar in the course of segmentation training step 105. The solder bump identification step 106 results from a comparison with the model constructed from input blueprint data 6 at step 101. Once the solder bump pattern PI is located, mechanism 18 may, for example, accurately place a die 16 on a substrate 26 as shown in FIG. 1C via locator control signals from system 8 to mechanism 18. With the bump pattern located, the position of all blueprint bumps can be back projected to the camera space. As a further step, if required, the nominal sites of the bumps on the die 16 can be examined in detail to assess their quality. Now, the process will be described in detail with reference to FIGS. 2–8.

Figure 2:
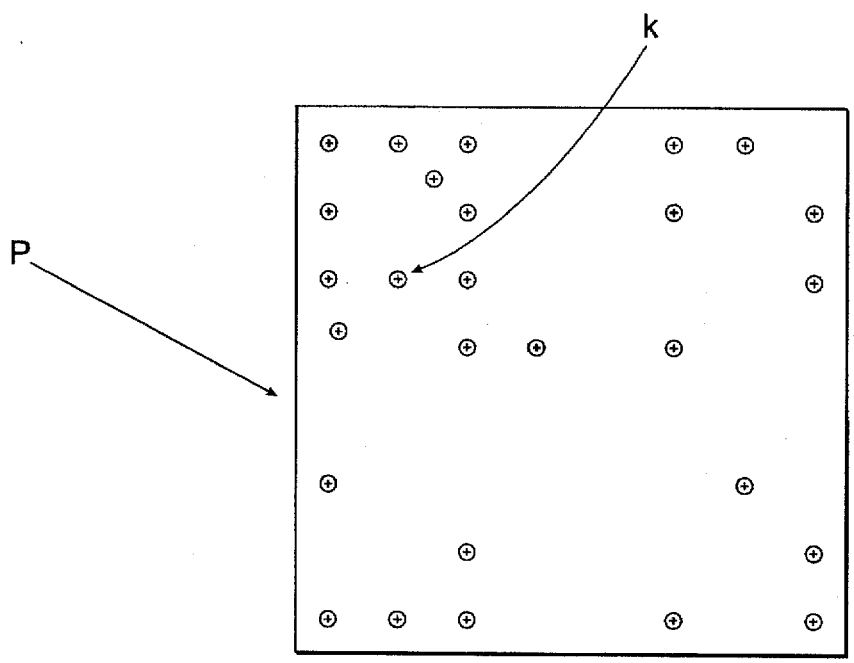
FIG. 2 is a plan view of an imaged solder bump pattern to be identified according to the invention.
Figure 5:
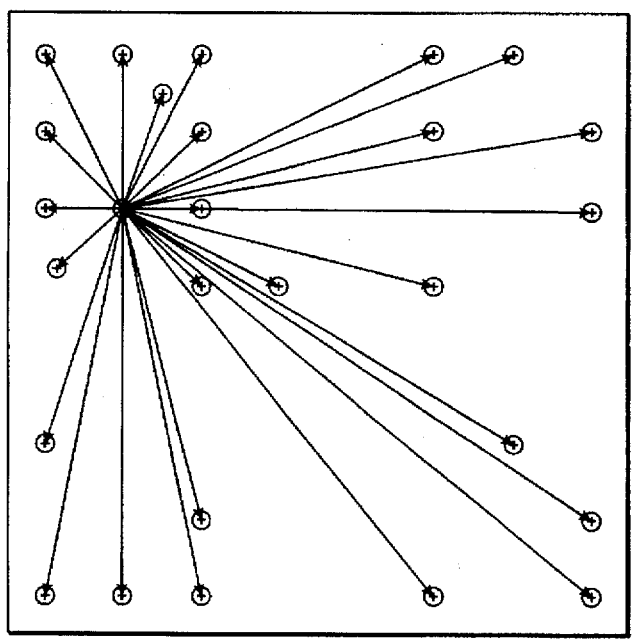
FIG. 5 is a plan view of the solder bump pattern shown in FIG. 2 with the set of bump representation vectors representing the $k_{the}$ bump thereon.
Figure 3:
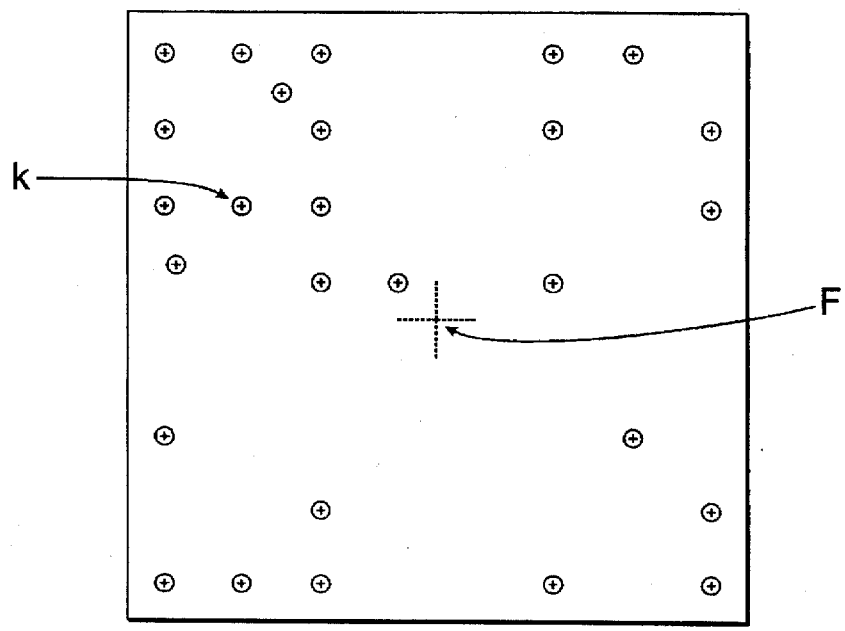
FIG. 3 is a plan view of the solder bump pattern shown in FIG. 2 with a coordinate reference frame superimposed thereon.
Figure 4:
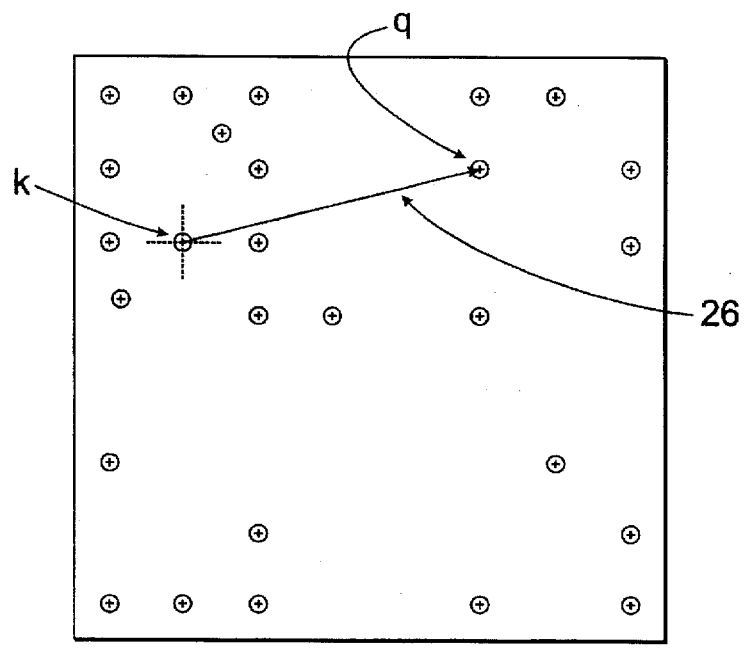
FIG. 4 is a plan view of the solder bump pattern shown in FIG. 2 with a bump representation vector shown thereon.

An example of such a bump pattern P is shown in FIG. 2. A bump chosen from the pattern as bump k is so indicated. A convenient reference frame F is selected and superimposed on the pattern as shown in FIG. 3, for example, the cross in the center of the pattern, typically, the reference frame of the robotic arm carrying the component 16. Referring to FIG. 4, the representation for each bump is a multi-dimensional vector. The model representation for the $k_{th}$ bump is the global vector $R_k$ shown in FIG. 5, where:

$$R_k = [R_{k1} \ldots R_{kk-1}\, R_{kk+1} \ldots R_{kn}],$$

and n is the number of solder bumps in the pattern. The model for the entire solder bump pattern is the composite of representations for each of the n individual bumps in the pattern. The elements of this vector are themselves the position vectors of the other bumps in the pattern described in a complex coordinates frame of reference with its origin at the location of the solder bump whose representation is sought, as shown in FIGS. 4 and 5.

For convenience, each position vector can be expressed by its two complex domain components, that is, a modulus R and an argument $\Phi$. For example, the position vector 26 of the $q_{th}$ bump in the $k_{th}$ bump's reference frame, as shown in FIG. 4, is given by:

$$R_{kq} = R_{kq} \Phi_{kq} = R_{kq} e^{\Phi k} = X_q - X_k + j(Y_q - Y_k)$$

Importantly, this vector representation for a bump is translationally invariant with all orientation information confined to the arguments of each vector element. The representation can be conveniently scaled by disregarding arguments or moduli which do not fall within a user-defined range. This discarding of arguments/moduli improves computational efficiency and uniqueness of pattern representation need not be compromised.

Utilizing the position vector representations and equations defined above, a collection of models of all of the solder bumps in the pattern defines the complete set of prototype classes for solder bumps which can be used as a reference for comparison with the image taken by camera 12. Because this collection is so numerous, it may be desirable to narrow down or "prune" the classes by eliminating those that can easily be discounted as a match with the image taken by camera 12. Reducing the collection of prototype classes is accomplished by classifying each model solder bump representation against all others through the same classification process which, as described below, is used to classify the imaged solder bumps taken with camera 12. Those blueprint solder bumps which classify incorrectly are removed from the prototype class list. By scanning the prototype classes, which can be done in both ascending and descending orders, a subset of prototype classes with unique representation within the permissible rotation bounds is obtained.

Figure 6:
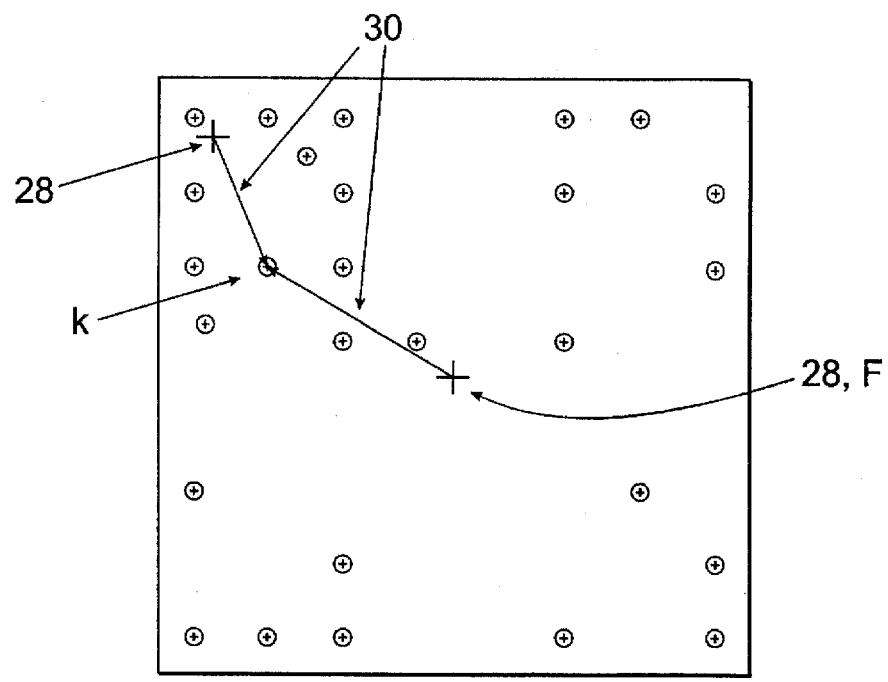
FIG. 6 is a plan view of the solder bump pattern shown in FIG. 2 with anchor pints and anchor vectors according to the present invention shown thereon.

Two arbitrary anchor points 28, (one of which may be reference frame F of FIG. 3) as shown in FIG. 6, are defined for the pattern model. Although the anchor points 28 are arbitrary, for example, the locations of the two farthest apart prototype solder bumps may be chosen as the anchor points for convenience and because they are most "error-resistant", that is, they have the longest distance or "wheelbase"

between them, and thus have the least impact on the subsequently determined displacements.

A pair of anchor vectors 30 are derived for every prototype solder bump. The location of these anchor points and vectors are stored in memory (not shown) for subsequent reference to determine the displacements between each solder bump and the anchor vectors attributed to that bump. Thus, in FIG. 6, anchor vectors 30 determine the displacement between the solder bump k and the anchor points 28.

Figure 7:
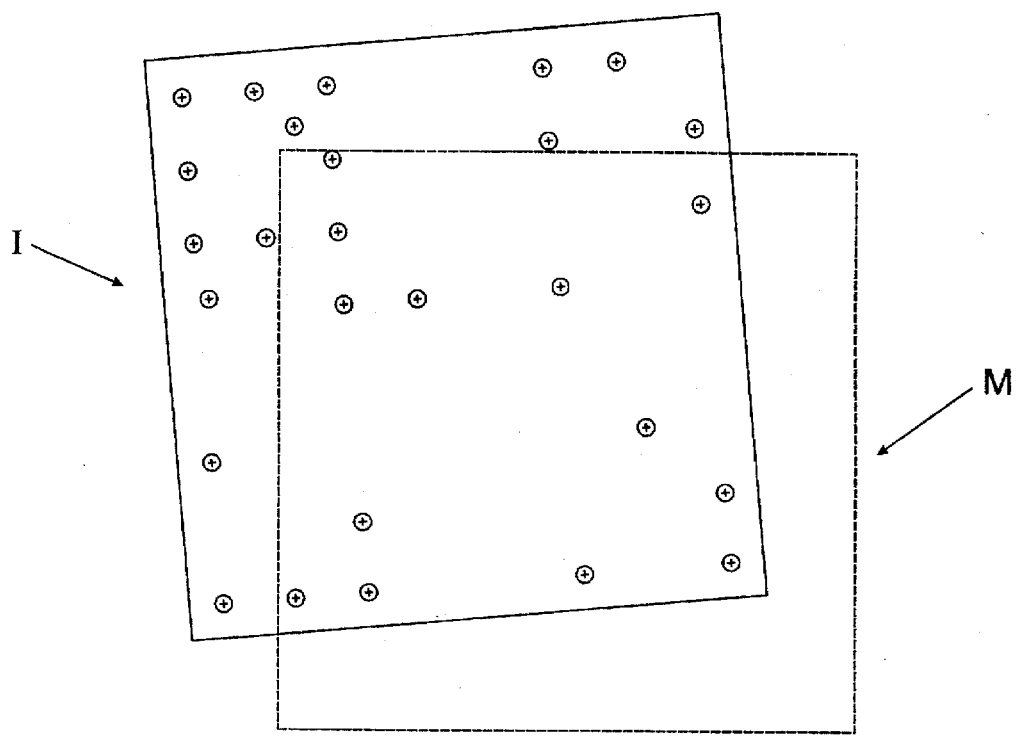
FIG. 7 is a plan view of the solder bump pattern shown in FIG. 2 with the actual bump pattern translationally and rotationally offset from the expected location.
Figure 8:
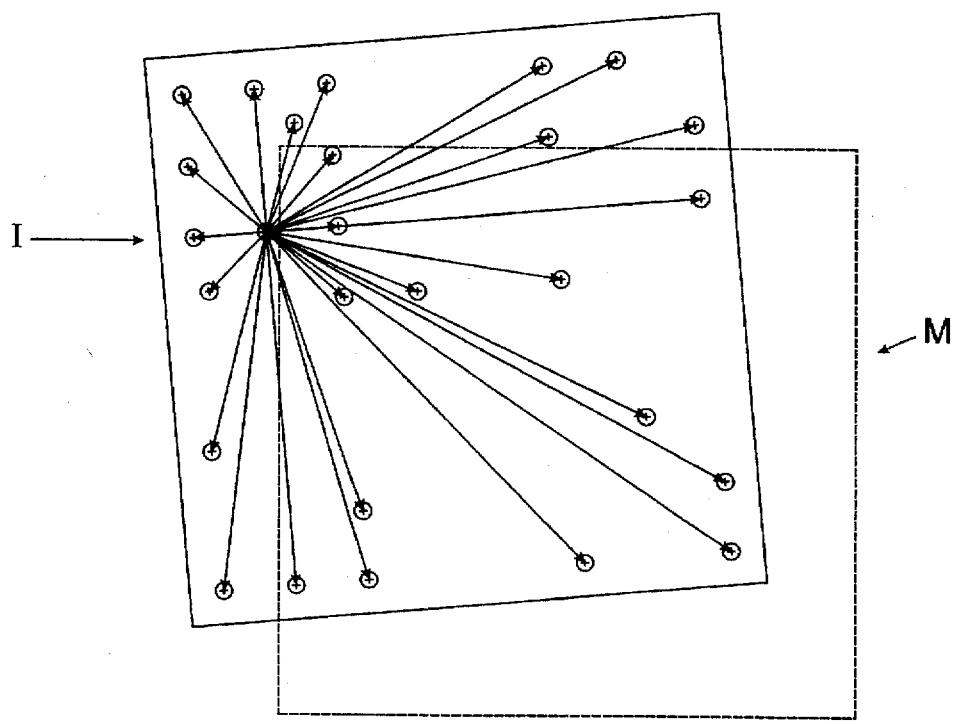
FIG. 8 is a plan view of the solder bump pattern shown in FIG. 2 showing the actual array of representation vectors measured for a bump which will ultimately be classified as corresponding to the $k_{the}$ bump.
Figure 9A:
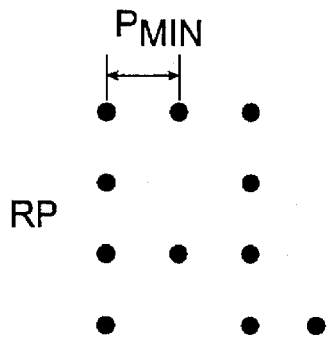
FIG. 9A is a schematic view of a reference pattern having a minimum distance between the individual features of $P_{MIN}$.
Figure 9B:
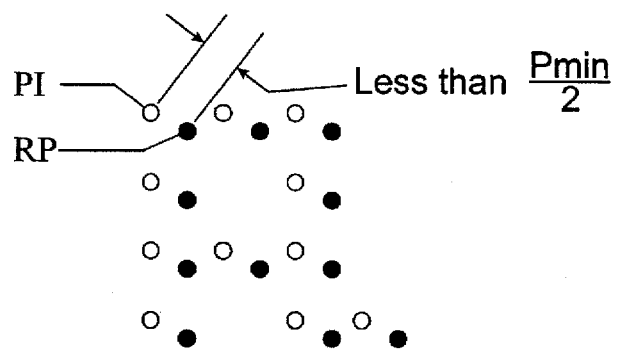
FIG. 9B is a prior art schematic view of a reference pattern and an imaged pattern showing the imaged pattern displaced by a distance less than $P_{MIN}/2$, as required by conventional systems.
Figure 10:
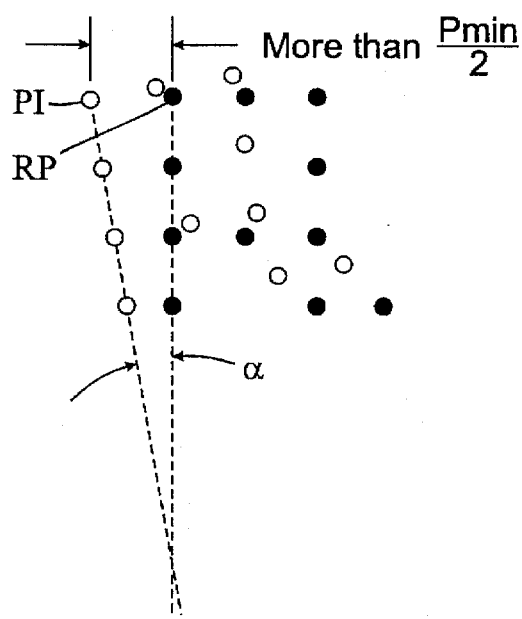
FIG. 10 is a schematic view of a reference pattern and in imaged pattern showing the imaged pattern displaced by a distance greater than $P_{MIN}/2$, and also rotated by an angle α.

Once the blueprint models are completed and stored, then the camera image I of actual solder bumps can be obtained and digitized. The digitized image is stored in memory of system 8 and compared with the blueprint models M as pictorially represented by FIG. 7. As discussed above, an image segmentation process can be used to reduce the imaged solder bumps to singular points located at the center of the bump's annular image, as shown in FIG. 7. Each such point is assigned a multi-dimensional vector representation whose elements are derived from the coordinates of all other such points in a complex coordinate frame of reference with its center located at the point whose representation is sought, as shown in FIG. 8. The multi-vector representation of the image is determined in the same way as the multi-vector representation of the blueprint model, using the equations set forth above.

The vector representation of the blueprint solder bump pattern is compared to the vector representation of the imaged solder bump pattern. In this way, each point representing a solder bump in the image is identified as corresponding with a point in the blueprint model. Any deviation, that is, translation and/or rotation, necessary to transform the imaged solder bump pattern into the blueprint pattern can be measured in terms of distance and rotational angle to define the actual pattern location relative to the ideal model. As a consequence, mechanism 18 may be controlled accordingly by locator signals representing distance and/or angle output from image processing system 8 for reaching its destination as per FIG. 1C.

The comparison between the representation vector of actual imaged solder bumps and the model bump classes can be performed in any suitable manner. The "brute force" method could be used wherein every imaged bump from the actual pattern under consideration is compared to every bump in every reference pattern stored in the system, without any "pruning" or narrowing of the reference patterns or images.

However, since the brute force method is extremely time-consuming, albeit very accurate and precise, it may be desirable to impose "uniqueness" or "global constraints" on exemplar moduli or arguments of the vectors representing a reference pattern so as to reduce the time required to identify a particular pattern. For example, since each vector is composed of a length and an orientation, and since the vectors to other nearby bumps will be "redundant" with those to further bumps, one might decide to ignore all vectors having a length less than some arbitrary amount. For another example, if the measured arguments, $\Phi$, in an imaged bump's representation are bounded ($-5°<\Phi<+95°$) for all measured vector elements of a bump, then the model classes for bumps should be searched starting with those for bumps in the lower left corner of the image. These and other such strategies can be used to increase the efficiency of the comparison process, although some accuracy and precision will be sacrificed.

A second video camera (not shown) with an attached illuminator may be used to image the mounting pads or other registration features of the substrate on which the component is to be mounted. In this way, the position and orientation of the component and the location on the substrate for receiving the component can be matched.

The above description of the present invention as described for so-called "flip chips" is for illustrative purposes only. The technique may likewise find application for locating ball grid array, column grid array or leaded electronic components or other electronic or other components. Modifications can be made within the scope of the invention as defined in the appended claims.

We claim:

1. A pattern recognition system comprising:

means for generating at least one reference pattern with a defined nominal location formed of individual features, wherein a minimum distance between any adjacent two individual features is defined as $P_{MIN}$ within a number of individual non-colinear features greater than two, means for storing a representation of said at least one reference pattern;

means for capturing an image of an actual pattern to obtain a representation of an imaged pattern; and means for comparing said representation of said imaged pattern with said representation of said at least one reference pattern; and means for identifying a deviation of said imaged pattern from said reference pattern, said deviation being determined even if the individual features in said imaged pattern have been translated by more than one half $P_{MIN}$.

2. A pattern recognition system as in claim 1, wherein said means for generating includes means for:

(I) representing a particular individual feature k of a blueprint as a multi-dimensional vector $R_K$ that also represents position vectors of each other individual feature q with respect to a location of feature k in a complex coordinate system having its origin at individual feature k;

(ii) expressing each position vector by its two complex domain components to obtain position vector $R_{kq}$ of features k and q; and (iii) creating a vector model made of a plurality of prototype classes for the reference pattern by making a composite of representations for each individual feature.

3. A pattern recognition system as in claim 2, wherein said means for generating further includes means for reducing the number of prototype classes by applying uniqueness or global constraints on moduli or arguments of the position vectors in said model.

4. A pattern recognition system as in claim 2, wherein said means for generating further includes means for selecting two arbitrary anchor points and means for generating anchor vectors between each individual feature and said anchor points.

5. A pattern recognition system as in claim 4, wherein said means for comparing includes means for:

(i) representing a particular individual feature k of said imaged pattern as a multi-dimensional vector $R_k$ that also represents the position vectors of each other individual feature q in said imaged pattern with respect to the location of feature k in a complex coordinate system having its origin at individual feature k;

(ii) expressing each position vector by its two complex domain components to obtain $R_{kq}$;

(iii) creating a vector model of said imaged pattern by making a composite of representations for each individual feature; and (iv) comparing the vector model of said imaged pattern with the vector models of every reference pattern.

6. A pattern recognition system as in claim 1, wherein said individual features are solder bumps on an electronic component.

7. A pattern recognition system as in claim 1, wherein said individual features are leads on an electronic component.

8. A pattern recognition system as in claim 1, further comprising a means for illuminating an actual pattern including an array of LED's disposed oppositely of one another that project a shallow cone of light onto an electronic component.

9. A pattern recognition system as in claim 8, wherein said means for illuminating further includes foreground and background shields.

10. A pattern recognition system as in claim 1, wherein said means for capturing includes means for applying an image segmentation process to reduce the image of said imaged pattern to singular points in a complex reference frame.

11. A pattern recognition system as in claim 1, wherein said means for identifying a deviation determines said deviation, if the pattern is four-fold rotationally symmetric, even if the features have been rotated by as much as 45°.

12. A pattern recognition system as in claim 1, wherein said means for identifying a deviation determines said deviation even if the features have been rotated more than 45° depending on the symmetry of the pattern.

13. A pattern recognition system as in claim 1 wherein said means for generating includes means for generating representation vectors for individual features of said at least one reference pattern.

14. A method of recognizing a pattern, comprising the steps of:

generating at least one reference pattern formed of individual features, wherein a minimum distance between any adjacent two individual features is defined as $P_{MIN}$ within a number of individual non-colinear features greater than two;

storing a representation of said at least one reference pattern;

capturing an image of an actual pattern to obtain a representation of an imaged pattern; and comparing said representation of said imaged pattern with said representation of said at least one reference pattern;

identifying a deviation of said imaged pattern from said reference pattern, wherein said deviation can be determined even if the individual features in said imaged pattern have been translated by more than one half $P_{MIN}$.

15. A method as in claim 14, wherein said step of generating at least on reference pattern includes the steps of:

(I) representing a particular individual feature k of a blueprint as a multi-dimensional vector $R_k$ that also represents position vectors of each other individual feature q with respect to a location of feature k in a complex coordinate system having its origin at individual feature k;

(ii) expressing each position vector by its two complex domain components to obtain position vector $R_{kq}$ of features k and q; and (iii) creating a vector model made of a plurality of prototype classes for the reference pattern by making a composite of representations for each individual feature.

16. A method as in claim 15, wherein said step of comparing includes the steps of:

(i) representing a particular individual feature k of said imaged pattern as a multi-dimensional vector $R_k$ that also represents the position vectors of each other individual feature q in said imaged pattern with respect to the location of feature k in a complex coordinate system having its origin at individual feature k;

(ii) expressing each position vector by its two complex domain components to obtain position vector $R_{kq}$;

(iii) creating a vector model of said imaged pattern by making a composite representations for each individual feature; and (iv) comparing the vector model of said imaged pattern with the vector models of every reference pattern.

17. A method of recognizing a pattern as in claim 14, in said deviation identifying step, identifying the deviation, if the pattern is four-fold rotationally symmetric, even if the features of said pattern have been rotated by as much as 45°.

18. A method of recognizing a pattern as in claim 14, in said deviation identifying step, identifying the deviation even if the features of said pattern have been rotated by more than 45° depending on the symmetry of said pattern.

19. A method of recognizing a pattern as recited in claim 13 further comprising the step of illuminating an actual pattern formed of individual features so as to provide a sufficient degree of sharpness and contrast of each individual feature.

20. A method of recognizing a pattern as recited in claim 14 wherein said reference pattern generating step further includes the step of reducing the number of prototype classes by applying uniqueness or global constraints on the moduli or arguments of the position vectors in said model.

21. A method of recognizing a pattern as recited in claim 13 wherein said capturing step includes the step of applying an image segmentation process to reduce the image of said imaged pattern to singular points in a complex reference frame.

22. A pattern recognition system as in claim 14 wherein said means for generating includes means for generating representation vectors for individual features of said at least one reference pattern.

* * * * *